US008386498B2

(12) United States Patent
Whitehouse

(10) Patent No.: US 8,386,498 B2
(45) Date of Patent: Feb. 26, 2013

(54) MESSAGE DESCRIPTIONS

(75) Inventor: Sanford Whitehouse, San Jose, CA (US)

(73) Assignee: LogLogic, Inc., San Jose, CA (US)

( * ) Notice: Subject to any disclaimer, the term of this patent is extended or adjusted under 35 U.S.C. 154(b) by 191 days.

(21) Appl. No.: 12/536,444

(22) Filed: Aug. 5, 2009

(65) Prior Publication Data

US 2011/0035390 A1    Feb. 10, 2011

(51) Int. Cl.
    *G06F 17/30* (2006.01)
(52) U.S. Cl. ................... 707/755; 707/741; 707/756
(58) Field of Classification Search .................. 707/741, 707/755, 756
    See application file for complete search history.

(56) References Cited

U.S. PATENT DOCUMENTS

| | | | |
|---|---|---|---|
| 4,586,160 A | 4/1986 | Amano et al. | |
| 5,463,768 A | 10/1995 | Cuddihy et al. | |
| 5,867,799 A | 2/1999 | Lang et al. | |
| 6,119,079 A * | 9/2000 | Wang et al. | 715/234 |
| 6,134,664 A | 10/2000 | Walker | |
| 6,144,967 A | 11/2000 | Nock | |
| 6,317,787 B1 | 11/2001 | Boyd et al. | |
| 6,393,479 B1 | 5/2002 | Glommen et al. | |
| 6,598,179 B1 | 7/2003 | Chirashnya et al. | |
| 6,766,370 B2 | 7/2004 | Glommen et al. | |
| 7,870,117 B1 * | 1/2011 | Rennison | 707/706 |
| 7,886,041 B2 * | 2/2011 | Outhred et al. | 709/224 |
| 7,890,543 B2 * | 2/2011 | Hunt et al. | 707/803 |
| 7,904,955 B1 * | 3/2011 | Bu et al. | 726/22 |
| 7,962,582 B2 * | 6/2011 | Potti et al. | 709/220 |
| 8,001,064 B1 * | 8/2011 | Rennison | 707/732 |
| 8,001,106 B2 * | 8/2011 | Agarwal et al. | 707/709 |
| 2003/0126229 A1 * | 7/2003 | Kantor et al. | 709/217 |
| 2003/0172053 A1 | 9/2003 | Fairweather | |
| 2004/0215721 A1 * | 10/2004 | Szeto et al. | 709/204 |
| 2005/0108630 A1 * | 5/2005 | Wasson et al. | 715/513 |
| 2006/0117091 A1 | 6/2006 | Justin | |
| 2006/0184529 A1 | 8/2006 | Berg et al. | |
| 2007/0094387 A1 * | 4/2007 | Hahn et al. | 709/224 |
| 2007/0265946 A1 * | 11/2007 | Schimpf et al. | 705/35 |
| 2009/0089252 A1 | 4/2009 | Galitsky et al. | |

OTHER PUBLICATIONS

Gerhards, Rainer, "On the Nature of Syslog Data," MonitorWare.com [online], Copyright 2003, retrieved from the Internet, URL: < http://www.monitorware.com/en/workinprogress/nature-of-syslog-data.php>, retrieved on Aug. 5, 2009, 8 pages.
Ranum, Marcus, J., "System Logging and Log Analysis," [online]; 1999-2005; retrieved from the Internet, URL: <http://www.ranum.com/security/computer_security/archives/logging-notes.pdf>; 235 pages.
"Backus-Naur Form," Wikipedia.com [online]; Retrieved from the Internet, URL: <http://en.wikipedia.org/wiki/Backus%E2%80%93Naur_Form>, retrieved on Nov. 30, 2009, 5 pages.

* cited by examiner

*Primary Examiner* — Rehana Perveen
*Assistant Examiner* — Tiffany Thuy Bui
(74) *Attorney, Agent, or Firm* — Fish & Richardson P.C.

(57) ABSTRACT

Messages (e.g., log messages or any form of record oriented data) are analyzed for identifiable value patterns. When a pattern is located the value is replaced by a name or "token" for the pattern, resulting in a "message description" for the message. When analysis is finished and token/value replacements are complete the message description can be stored as a reference to the message.

21 Claims, 6 Drawing Sheets

MESSAGE DESCRIPTIONS

TECHNICAL FIELD

The subject matter of this application is generally related to computer log management.

BACKGROUND

Log management is a process of collecting, aggregating, analyzing, alerting on and archiving data from various computer network devices, such as servers, routers, switches, firewalls, etc. Log search is a process of identifying individual log messages associated with events. Log search, as a part of log management, can assist in achieving corporate compliance goals and reduces the risk of legal exposure from security breaches. Log search can also significantly reduce network downtime by helping information technology (IT) departments identify particular problems in a network, and fix those problems by identifying and analyzing log messages potentially associated with those problems.

An important aspect of log analysis is the ability to search for associated log messages (e.g., associated pairs or triples of log messages). Conventional search approaches use an index which allows retrieval of a sequence of search items. For example, web search and desktop search provide means to access individual entities, such as documents or database records. These searches, however, are of limited value in log management because groups of associated log messages can be difficult to retrieve.

Another problem with conventional log management systems is the overall cost in time and resources needed to create parsing rules.

SUMMARY

Messages (e.g., logs, log messages, or any form of record oriented data) are analyzed for identifiable value patterns. When a value pattern is located in the message, the value is replaced by a name or "token" given to the pattern, resulting in a "message description" for the message. When analysis is finished and token/value replacements are complete, the message description is kept in a data store as a reference to the original message. Analysis can take the form of general string patterns, the application of prior knowledge of the message and value syntax, or user-defined characteristics of a message/value that help refine the analysis process.

In some implementations, each identified value is given a name. The name can be arbitrary, related to the general pattern, or derived from elements of the message, such as name/value pairs, relationships to words in the message, or names known to belong to the value. A message description can conceptually include the relationship of the message to its values stored for each token in the message description. In contrast to conventional log management systems that focus mainly on independent messages, a system using message descriptions can conceptually include the relationship between two or more messages. For example, a combination of a login message and a logout message is a user session. Sets of message descriptions can be compared to the remaining records by constructing a parsing rule that supports the message descriptions. The parser can compare rules to subsequent messages in a message set. The process can repeat for any message that does not match an existing message description. The result can be a set of message descriptions that describe all messages in a message set.

Once the set of message descriptions are complete, the user can make corrections to the analysis. Corrections can be stored and used in later analysis to refine the process. After the user accepts the message descriptions, the message descriptions can be used to construct a parser, parsing rule, or any other form of configuration or software code to process messages. The message descriptions can be independent of parser, parsing, or tokenizing technology that would make use of the message descriptions.

Message descriptions can be the foundation for message identification, parsing, classification, data store in log management systems or any other system that uses records. For example, message descriptions allow for automated parser construction, automated parser rule construction, refined manual and automatic classification of a message based on a complete message description, message description driven database schema or other data store method construction automation, messages description driven report construction automation and refined index or other type of raw message search construction automation.

DETAILED DESCRIPTION

Log Management System Overview

Figure 1:
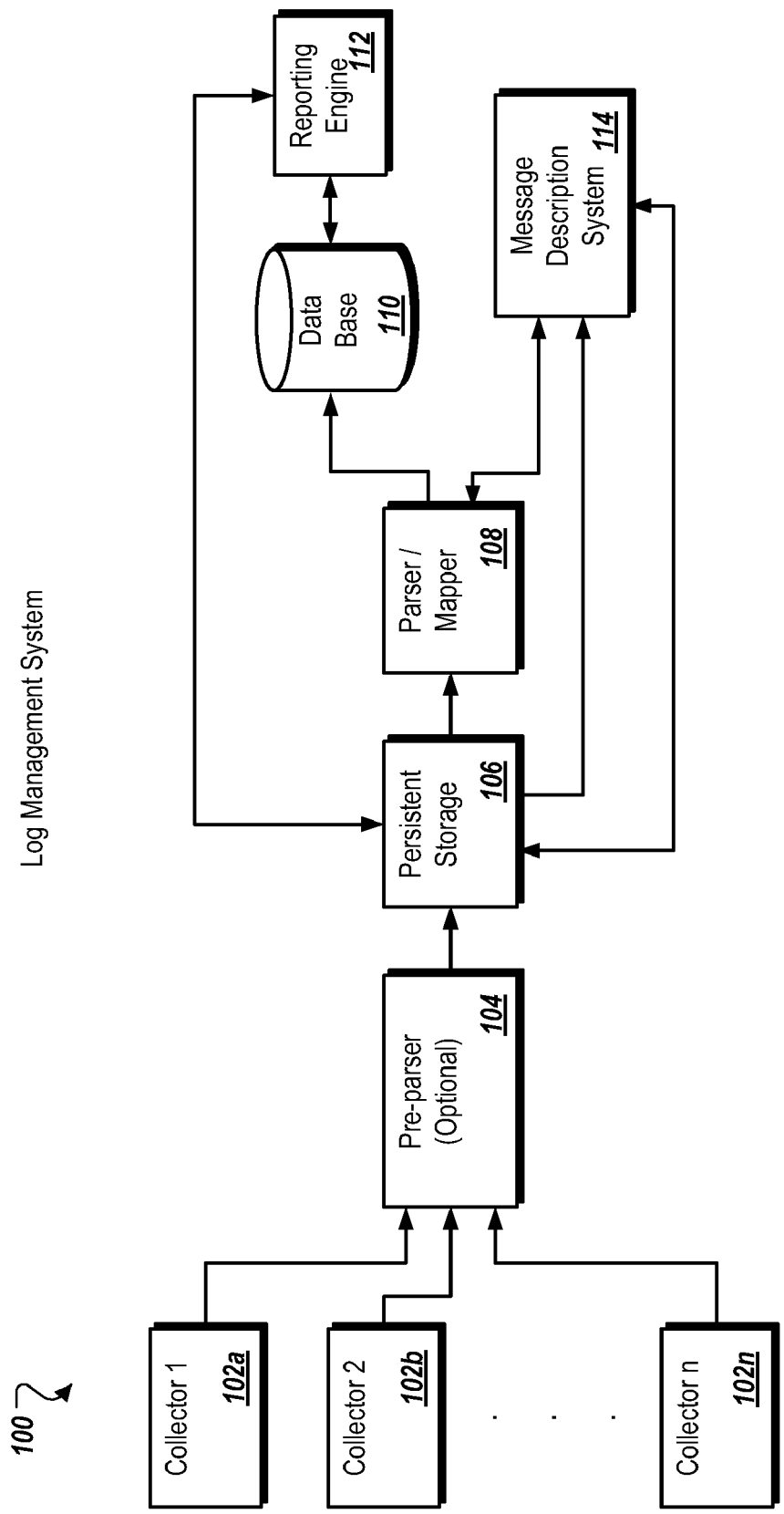
FIG. 1 is a block diagram of an exemplary log management system.

FIG. 1 is a block diagram of an exemplary log management system 100. In some implementations, the log management system 100 includes one or more collectors 102a through 102n, a pre-parser 104, persistent storage 106, a parser/mapper 108, a database 110, a reporting engine 112 and a message description system 114. In some implementations, the reporting engine 112 can be included in the message description system 114. In some implementations, the message description system 114 can include a search engine for searching database 110.

In some implementations, the collectors 102a through 102n are operationally coupled with the pre-parser 104. In some implementations, the various components of the system 100 can be co-located on the same hardware platform, or located on multiple hardware platforms connected by one or more networks (e.g., Ethernet, Internet, intranet). Each of the collectors 102a through 102n can be any device that collects event data from one or more other computing devices or applications. Such information collection can be active or passive, and can include information such as error messages, user transactions, system events, application milestones, and data access attempts, etc. For example, the collector 102a can be a LogLogic LX 500 appliance (manufactured by LogLogic, Inc. of San Jose, Calif.), which can be configured to passively collect and analyze information, such as, for example, messages, errors and transactions as they occur on one or more data servers. Other event information collected actively from the same servers can include availability status, current storage capacities, resource usage, etc. In another example, the collector 102b can be a LogLogic LX 2000 appliance, which can be configured to actively and passively collect and analyze information from e-mail systems, such as, for example, message/attachment statistics, failed login attempts, password changes, etc.

The information collected by collectors 102a through 102n is transmitted to the pre-parser 104. Such information can be transmitted via "flat files" produced by sequentially logging events as they occur, or as periodic messages representing snippets of the flat files. In some implementations, transmission of log data can follow one or more standard networking protocols, such as Transmission Control Protocol (TCP), for transmitting data as a stream of bytes. The collectors also append information to each log message, which describes the context of the message (e.g. time the log message was received by the collector, the source device where the message originated).

The pre-parser 104 receives raw log information, together with the context header generated by the collectors, from the one or more collectors 102a through 102n. During the process, the pre-parser 104 determines the log source type and version, using pre-defined signatures for each log source (e.g. Cisco® Firewall version 7, Oracle® Database version 10). The pre-parser 104 stores this information with the unaltered log information in persistent storage 106 for subsequent use by the log management system 100.

In some implementations, the pre-parser 104 can be omitted and identification of log source types and versions can be performed by collectors 102a through 102n.

The system 100 uses the persistent storage 106 to store log information received from the pre-parser 104. In some implementations, the storage method can employ one or more "flat files" containing individual logs messages. For example, a "row" in a flat file containing log messages from an email system can contain a user's name (e.g., "Matt"), IP address, location, and event occurrence, such as a failed login attempt. Such an entry can include a timestamp for identifying the time (e.g., down to the minute or fraction of a second) that the entry was made. In some implementations, the system 100 can be configured to retain certain logs in the persistent storage 106 for a user-specified period of time. For example, log files containing event data pertinent to Health Insurance Portability and Accountability Act (HIPAA) regulations can be retained for several years.

The parser/mapper 108 uses log information contained in the persistent storage 106 to generate tags, or indices, representing the data. The process includes the action of parsing lines of log information stored in the persistent storage 106 while searching for pertinent event data. Such parsing processes can employ pre-defined parsing rules and keyword indices. For example, parsing a log file from an email application can employ parsing rules that specify that the system 100 is to search for user-related event data containing "USER_ID" and the user's name in brackets. In addition to parsing, the parser/mapper 108 maps the information it locates to the corresponding log file and associated event data in the log file. In such a way, a specific log file's event data, such as that containing "USER_ID:[MATT]," can be mapped. In another example, parsing rules and keywords can exist such that a daily application milestone, for example "CERES END OF DAY," is extracted from a system log along with a timestamp. Such information can be used to compare (and report over time) regular event occurrences, such as the "END OF DAY" event for an application named "CERES."

In some implementations, the operations performed by the parser/mapper 108 can occur in near real-time as log file entries are available in the persistent storage 106. In other implementations, the parser/mapper 108 can be scheduled to execute at pre-determined intervals or thresholds, such as those based on elapsed time or log file size.

The system 100 can store indices for mapped log information in one or more databases. For example, the system 100 can use the database 110 to store an inverted index representing mapped log information in the persistent storage 106. In some implementations, entries in the database 110 can be created by the parser/mapper 108. A user employing the reporting engine 112 can access the database 110 to aid in executing standard text searches using regular expressions.

One possible implementation of the attribute/value generation is done through regular expression rules. First a set of regular expression rules, which constitute the preparser rules, detect the "signature"" of different message types. Once the log message type is identified by its signature, a set of rules, which constitute the parser rules, specific to the message types are applied to extract the different attribute/value sets from each message. After the initial extraction of the attribute/value sets, there can be additional rules which add additional attributes to the message. These latter set of rules essentially segment the space of the initial attribute/value set (generated by the regular expression rules) into regions, and label each region with a new attribute/value. We refer to these latter set of rules as mapping or classification rules.

An example of the process described above is as follows. First, a signature of the message identifies it as a "typeA" log. Next, rules for a "typeA" log are applied. This step could generate, for example, the attributes: user=uuu, device=ddd, action=aaa and result=rrr. If a user is in set {a, b, c} and an action is in set {a1, a2, a3}, then criticality=ccc. The overall attribute/value set for the message which gets stored will be the union of steps 1, 2 and 3 above, i.e., the message is transformed in the following set of attribute/value pairs: (message type=typeA, user=uuu, device=ddd, action=aaa, result=rrr, criticality=ccc).

The process of generating a report using the reporting engine 112 can begin when a query originating on the reporting engine 112 is sent to the database 110. For example, the query's purpose can be to search for email event data associated with a user named "MATT." Upon receipt of the query, the database 110 transmits the corresponding indices to the reporting engine 112. Using these indices, the reporting engine 112 requests the corresponding event data from the persistent storage 106. The reporting engine 112 receives the corresponding event data, completing the process. In some implementations, the database 110 and the reporting engine 112 can be implemented using open source database or search technologies, for example MySQL® or Lucene®.

Using the technologies described above can facilitate token-based searches such as "find me all the event data entries that contain the phrase 'failed login attempt'." Such searches can utilize Boolean functions, wildcard characters, and other special query tools. However, the predefined schemas and structured reports available by using the database 110 and the reporting engine 112 alone can limit the complexity and scope of queries performed on the system 100. In particular, users can search on raw log messages with more sophisticated queries, particularly queries that are based upon relationships between attributes of related event data in the log files. For example, instead of just searching on text, the queries can depend on the type of information, including token values, associated with specific fields in message descriptions. Such reporting capabilities can be facilitated by a message description system 114, as described below.

Message Description System Overview

The message description system 114 receives log messages and automatically generates tokenized representations or "message descriptions" of the messages. For example, as will be described in detail below, individual portions of each message can be identified as to the type of portion it is (e.g., a phone number, an IP address, a user name, etc.) and the information it represents. For instance, instead of simply storing the string for that portion or the message, an identifier for that portion can be stored (e.g., stored in database 110) along with the value corresponding to that instance. In this way, users of the log data (e.g., applications, reports, users running queries, etc.), can have access to the message descriptions, allowing the information to be accessed and used in a more meaningful way. For instance, using the message descriptions can be used to list all messages containing phone numbers in a certain area code, find all messages containing a particular IP address, list all log messages identifying commands corresponding to a specified username, etc.

In some implementations, the parser/mapper 108 can create message descriptions and/or use message descriptions created by the message description system 114 as a basis for creating parsing and/or mapping rules.

Message Description Processing Overview

Figure 2:
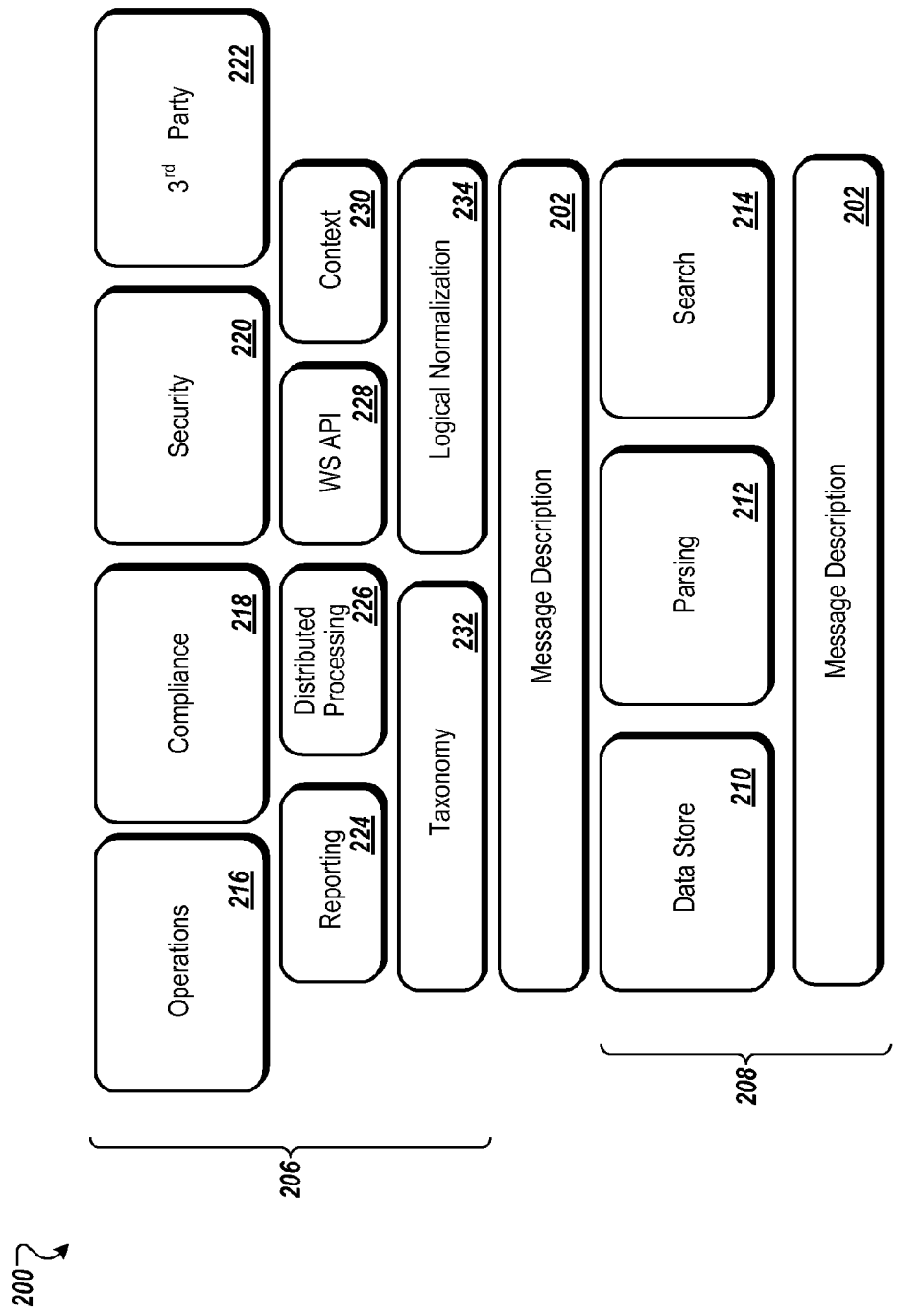
FIG. 2 is a block diagram of exemplary components in an architecture operable to create, process or use message descriptions.

FIG. 2 is a block diagram of exemplary components in an architecture 200 operable to create, process or use message descriptions. For instance, components in the architecture 200 can create and/or use original messages (e.g., as part of, or produced from, log messages or log event data), or generate and/or access message descriptions 202. The message descriptions 202 can be based on, for example, log messages generated by applications 206. Message description modules 208 can use the original message to produce message descriptions 202.

Message description modules 208 can include one or more data stores 210, a parsing module 212 and one or more search modules 214. Original messages enter the description creation process and are stored in data stores 210 or as part of search infrastructure 214. Message descriptions can be a handle for the original message and/or data parsed from the original message. In some scenarios, it is possible to use message descriptions after the original messages have arrived without storing the original messages or parsed data (e.g., a dashboard with message counts). The data stores 210 can store and manage, for example, the parsing rules, the raw log messages, the message descriptions, or any other data used for generating and handling message descriptions. The parsing module 212 can be used to automatically produce message descriptions while parsing original messages or other log event data. In some implementations, the parsing module 212 can also provide a user interface for a user to define information to be used during automatic processing, such as to define the names of tokens. The search module 214 can provide various ways to obtain information from messages and message descriptions. Using the search module 214, the user executes search queries that produce, for example, search results for a specific group of messages (e.g., all messages associated with a source user "Sanford" issuing commands on a specified server).

Applications 206 can include operations 216, compliance entities 218, security entities 220, third party applications 222, reporting applications 224, distributed processing 226, application programming interfaces (APIs) 228, context information 230, taxonomy information 232 and logical normalization 234. Operations 216 can include servers, routers, switches, firewalls or various large-scale applications, such any office or manufacturing applications that undergo large numbers of events (e.g., several thousand each day. Compliance entities 218 can include government or other regulatory entities that search on log information to check for compliance, such as business entities (e.g., banks, financial institutions, etc.), manufacturing facilities, or regulators of medical devices. Security entities 220 can include physical or electronic security providers that search log data, for example, for security breeches, such as servers, Government networks, etc. Third party applications 222 can include commercial off-the-shelf software, such as database, accounting or manufacturing software, that can generate log messages as a result of the execution of the software. Reporting applications 224 can include any software applications capable of generating reports, including applications and/or users issuing requests for information related to log data (e.g., using message descriptions). Distributed processing 226 and APIs 228 within the architecture 200 can, for example, facilitate the communication of applications distributed across one or more networks, such as permitting software applications to "call" or invoke applications at remote locations. Context information 230 can allow messages associated with one category of messages (e.g., message portions corresponding to specific tokens) to be contextually understood. Taxonomy information 232 can be used to classify messages in various ways (e.g., by their inter-relationships, etc.). Logical normalization 234 can be used to map different tokens into a single semantic representation.

Message Descriptions—Definitions

As described herein, a "message type" is a form of a message without regard for values. A "message description" is a message template (e.g., a copy of an original message) with values replaced by named tokens. A "named token" is a name string that replaces the value. For instance, an IPv4 address (e.g., 10.1.1.100) in a message can be replaced by the token IPV4_ADDRESS. In this example, the message "The user Sanford has logged in from 10.1.1.100" becomes, as the result of named token replacement, "The user %USER% has logged in from %SRC_IP%."

In some implementations, named tokens can have special characters, such as percent signs, at the beginning and end of the token name. In this way, applications that encounter the tokens can disambiguate the tokens from generic text strings. In other implementations, other symbols can be used, such as dollar signs, etc. In further implementations, different combinations of special symbols can be used, such as to differentiate the type of token. For example, tokens with dollar signs can be treated differently from tokens with percent signs.

Continuing with definitions, a "description token" can be a token with a particular format and name that identifies it as a description token in the message and applies semantic meaning to the value the token represents. In the description "The user %USER% has logged in from %SRC_IP%," the strings "%USER%" and "%SRC_IP%" are description tokens. Basic description token names can be annotated to include additional information. For example, the annotation can reflect the ordinal instance of a name (e.g., %USER_1 %, %USER_2%, etc.).

A basic description token can contain information about the string value it replaces (e.g., a value description, such as "%USER_1:\d+%"). Additional value attributes, including the value description, can be treated as attributes of the description token. These can tend to be application-specific, typically not part of the description itself.

A "general pattern" can be a string pattern that matches common patterns, or patterns that are independent of product or other specific context. An example is a integer, which is a string of character digits. The meaning can be general as well, for example, "Integer" can be the semantic description of a sequence of digits.

One example of a "known pattern" is an IPv4 address where the pattern can be described as 1-3 digits followed by a period. In this case, the pattern is repeated four times, and there is no period following the last digit. Known patterns can have specific meanings, such as "IPv4 Address."

A "specific pattern" can be a pattern that is characteristic of a log-generating product. It can be a general or known pattern where the meaning of the pattern is different from the general or known meaning. In other cases, it can be a string pattern that is unique to the product.

Message Analysis and Replacing Values with Tokens

Individual messages can be analyzed for values, and the values replaced with tokens. The token names can be provided based on the type of analysis performed and the ability to identify the value type. Value types can vary, such as being based on knowledge of the message type, the product or vendor that generated the message, or some combination thereof. Original messages can have a variety of formats, including but not limited to: one or more lines of text, XML or other structured formats and custom binary formats that need translation.

For example, consider a message that contains a string with the pattern "0xFF10" and that is a product of Microsoft Windows®. Prior knowledge of the message type can indicate (e.g., indicate based on previously-determined patterns) that this pattern is a "return code." As a result, the string value "0xFF10" can be replaced with "RETURN_CODE." Alternatively, the value string can be replaced instead with "HEX" if no knowledge exists relating the product as Microsoft Windows. In this case, prior knowledge evaluation of the string can be identified as a general type as hexadecimal.

Message analysis can be performed in several ways. In some implementations, as each message can be received by the analysis program, analysis and description generation (e.g., value string replacement with tokens, etc.) can be automatic. In some implementations, analysis can occur on an entire log file (or portion thereof), and the analysis and description generation can also be automatic.

In some implementations, analysis and description generation (or creation) can be performed by humans. For example, humans can perform the analysis when automatic methods fail to produce satisfactory results. In such a human analysis, a user can, for example, browse a set of messages. For each message, the user can identify a value and manually apply a name. Manual definition of a name can be facilitated, for example, through selecting the string in a tool and replacing it with a name from a list. In some implementations, manual definition of a name can be performed by editing the set of messages as if the set were a text document. Names can be assigned as a process of using the tools available in the editor (e.g., search, replace, etc.) to locate and replace a string of text.

Parser or Parser Rule Generation

As message descriptions are descriptions of a message, tools can be developed to interpret the message descriptions and generate a parser or rules for a configuration driven parser. For example, a parser can be generated by creating or assembling code that can be compiled into an executable. The form of the code can depend on the ability of a software developer to define the code in terms of the message descriptions and the desired parser implementation.

A parser rule can be created in the same manner. A tool can be created that interprets the message descriptions (e.g., tokens) and creates rules based on the parser requirements. In these cases, and any other case where a message description is used, the method of use can depend on the ability of the user to express the message description in the necessary form.

In some implementations, documentation can be used to generate message descriptions. In this case, any message description that is in the documentation can be used literally to express the message type used.

Parsing Optimization

A common problem with message parsing can be that message values can change patterns over time, or in some cases do not even exist. However, the message type does not change. At any given time, the parser can contain one or more patterns for the value that matches what has been identified in the past. Depending on how each pattern is written, a value change that does not match the pattern can cause the match to fail.

Addressing this common problem can typically be a manual process. First, the user can learn to accept that different value patterns for the same message type are possible. Most often this is not done and the messages will go unnoticed. If the user wishes to be sure, the process can be one of search and filtering to find differences. This can be a tedious process where the level of difficulty can vary by available tools, and the skill and patience of the user.

The user can sort out the messages that matched in the parser and those that did not match the parser. The next step can be to identify each message type in the set that did not parse successfully. The message type can be compared to the parser (or to the parsing rules) to find a close match. Once the close match is found, further comparisons can help to determine if the reason for parsing failure is due to a message type difference or a value pattern difference. If the latter is the cause, the parser can be updated with the new pattern(s). The process can be repeated for every message in the unparsed set. If the process is completely manual, it can take hours or days to go through a set. With tools, it can be possible to reduce it to hours, such as if the unparsed set is small and variations in message types are few.

The nature of a message descriptions allows one to make on-the-fly adjustments to a parser. There are several techniques to accomplish this. In some implementations, on-the-fly adjustments to a parser can be done by creating a message description of the new message. Descriptions of tokens that do not imply value patterns can be constructed, providing for value names (or description tokens) that are just names.

In some implementations, on-the-fly adjustments to a parser can be done by removing the description tokens from the new message descriptions. This leaves only the message text strings.

In some implementations, on-the-fly adjustments to a parser can be done by searching an index search repository for the existing descriptions where the token descriptions have been removed. The goal of the search is to find any descriptions that are similar to the new description. Using an index search can only be necessary if the set of descriptions is large. The new description can be compared to the returned values.

If a description already exists, the parser adjustment can be performed. Otherwise, the new description can be treated as unique and added to the set.

Parser adjustment can be done by comparing how each description token in the existing message description matches the values found in the message. The parser will have a match pattern, such as a regular expression. When the match pattern fails on a value, a match pattern is created. The current and new patterns can then be compared and adjusted such that all value patterns being considered will match. The existing description and the parser can then be updated.

Cases can exist where a value is interpreted as a word in description creation. Later, a value that is not a word can be found in another message. Adjustments to the parser can be made by presuming the description associated with the most description tokens is the most correct. The comparison can be performed, and the word can then be treated as a value. As a result, either the new description can supersede the current description, or the current description can be modified to add the new description token.

New Message Discovery

The parser optimization process can also enable new message discovery for the user. If a message type is considered new in the message description creation process, the user can be informed that it has been discovered. This can allow the user to make adjustments to other aspects of message use such as, for example, forwarding, tagging, parsing, and report or database mapping.

Processes for Creating Message Descriptions

There are a few ways the process for creating message descriptions can be approached, each providing similar results. In some implementations, a simple "regex" substitution method can be used. In other implementations, a string tokenization and message description construction method can be used. Each is now described in detail.

Simple Regex Substitution Process

When the simple "regex" substitution method is used for creating message descriptions, the basic method is to apply a set of regular expressions to a message. When a string in the message matches, the string is replaced with a description token.

A set of "primary" description tokens (a.k.a. "base" tokens) can be created. A primary token can have two elements; a token name, such as "%IPV4_ADDR%," and a regular expression. The set can contain any number of primary tokens or any number of regular expressions per token.

During the message description creation process, a message can be read into the message description creation program. The process can loop through the set of primary tokens, applying each primary token regular expression token to the message in succession. The process can capture and save the values matched by the expressions and associate each value with the token that matched. A value can match more than one token.

The process can continue until all primary tokens have been applied, at which time the process can loop through the set of saved values. The longest string can be located, and a determination can be made whether the string is still available in the message (e.g., the string has not been replaced by a description token). If no substitution has been made, the process can substitute the string with the token name. This process can continue until all strings have been tested and no further substitutions are possible.

The description can then be saved, for example, by converting the description into a regular expression. The regular expression can be immediately tested against the original message to validate a match. If no match is determined, the process can return an error and move to the next message. Otherwise, the description and corresponding regular expression can be added to a list, database, or other data structure.

During the processing of subsequent messages, each read message can be tested against existing regular expressions in the list. If a match is found, the current read message can be skipped, and the process can move on to the next message. If no match is found, the process can construct a message description as described above.

The process can repeat until all messages have been processed. Resulting message descriptions, including regular expressions and other results, can be saved for later use.

An original message can be stored based on how one needs to store data or use message descriptions. Log management may require that the original message be stored for compliance reasons or if the original message is considered the lowest or only form of data. If the original message is parsed and message descriptions are generated it is not necessary to store the original messages. The original messages can be recreated, to a reasonable degree, from the message description and the parsed data. Thus, storing the original message can be optional or driven by regulation.

String Tokenization and Message Description Construction

String tokenization is a process that can be used in some implementations. The process is well understood by those skilled in the art. The process involves splitting a string into substrings, or tokens, where the characteristics of each substring conform to a tokenization rule. The simplest rule is to treat each non-alphanumeric character as a delimiter. Delimiters can generally be configured to handle more complex strings, such as IP addresses and email addresses. Substrings are the characters that exist between each delimiter. This message description process uses the same approach to tokenize message. Converting it to a message description is a process of testing each substring to the set of substrings that define a description token.

This differs from the previous description of the "regex" process in a couple of ways. First, messages are consumed or processed from beginning to end, constructing description tokens during the consumption process, changing the form of the primary token. Instead of a single regex, each can be broken into a set of regexes that are a smaller, simpler set. A primary token can then be the combination of smaller regexes and the name of the token.

The steps in the process can start with reading through the set of primary tokens, adding each regex from the token set to a hash. A list can be associated to each hash key that contains the name of the token. The next step can split the message into substrings using a set of expressions that define common string delimiters, and the substrings can be added into the list.

An empty list can be created that will be used to contain the intersection of token lists. An empty accumulator list can also be created to contain substrings and token names that are the result of the message description construction process.

The process can loop through the message substring list, creating an inner loop for the set of regexes in the regex hash. The regex can be tested against the message substring. If a match is found, the process can find the intersection of token names associated with the matched regex and the token names in the intersection list. This process can continue until there are no matches in the regex test loop.

Once complete, the intersection list can be examined. If there are zero entries, the substring can be moved to the accumulator list. If more than one entry exists, an error can be raised. Ideally, when there is one entry, the token name can be added to the accumulator list.

The process can continue until all message substrings are exhausted, creating an empty message string, creating an empty regular expression string, looping through the accumulator list, and adding the element to the description string. If the element is a token, it can be replaced with a regular expression. The process can require looking ahead into the accumulator list to evaluate the correct expression to write, adding the result, string or token, to the regular expression string.

The process can continue until all elements in the accumulator list are used. The regular expression can be tested against the original message. If it does not match, an error can be raised. If it does match, the message description and regex can be saved.

The process can continue when the next message is read, testing against the set of description regular expressions. If a match is found, the process can continue to the next expression. If not, steps outlined above can be followed. This can continue until all messages have been evaluated.

Full Text Search

Message descriptions, once generated using processes described herein, can support many uses, such as a full text search. The general process of enabling a full text search is to tokenize a document, extract strings from the token list that meet the definition of a desired string (or word), add the document to a document repository, and add the strings to an index, referencing each string to the document.

When a search is performed, the search expression can be compared to the words in the index. A document reference can be returned with a number that represents some form of confidence (e.g., a probability, etc.) that the document is what was desired.

Indexes can be large, with the potential to be a high percentage of the size of the original document. Index lookup speeds can vary with the number of words, size of the documents, and number of documents.

The processing cost to index messages can be high, due to the overhead of the index in relation to the size of the string. Searching can also be costly, due to the number of documents (or messages) that need to be dealt with (e.g., millions per day can be common). Techniques can be developed to reduce the size and cost, with the added cost of special processing required in the technique.

By using message descriptions, many of the costs can be reduced while increasing search performance. For example, instead of indexing the messages, it can be beneficial to index the message descriptions.

While the set of messages seen in a day can approach petabytes, there are comparatively few message types. It is estimated that there are fewer than 1 billion message types in existence, including the most common variations and localization. In a typical logging environment, only a small percent of the messages can actually be seen. For example, less than 1% of the message types that a program logs can account for more than 99% of all the messages that are logged. As a result, costs for some search operations can be greatly reduced by focusing on the message descriptions.

An index of message descriptions can be created in the same manner as indexing documents. The set of message descriptions can be a predefined set or a set that is created and added to using dynamic descriptions as described above.

The set of documents can be relatively small and very stable. The cost associated with adding a new document to an index can be greatly reduced.

The index itself can be one or more indices. The boundaries (or qualifying attributes) can be vendor, product, product version, internationalization, and others. Instead of requiring a million description index, the same messages can be represented with significantly fewer (e.g., fewer than 20,000) message descriptions.

Searching against message description indices can be much faster due to the smaller number of index entries relative to documents. The size of the message description index can be smaller than a message index due the uniqueness of each message description. The index overhead for each message description can be very high, while maintaining overall cost savings. This comes from the message description representing a single message type rather than multiple instances of raw message variations.

A given search can return the message description, a confidence number, and a message description ID.

When the raw message is stored, it can be stored in a flat file, database, index, other data structure, or any combination thereof. A key can be the message description ID. The process to return a raw message can use the ID, not the indexed words.

The previous paragraphs indicate a number of techniques for storing and accessing documents based on a message description ID. The message description ID can be a unique value that is associated with that message description.

Each message description is typically unique. The uniqueness can be based, for example, on the uniqueness of the message syntax. In some implementations, uniqueness of message syntax can depend on the vendor that created the message. If a human cannot distinguish between two syntactically identical messages that represent different meaning and data, then a message description likely cannot make the distinction either.

Searches based on an ID can be much faster than the broadly comparative searches used in an index. One simple example is to keep the raw message in a simple text file. Each line in the file can contain a message description ID, the length of the message description, and the message description itself. A search for a message description can read each line in the file. The ID can be extracted and compared to the search ID. Upon encountering a match, the message description can be returned. When no match is encountered, the next line can be read. As a result, the need to perform complex comparisons can be eliminated.

In some implementations, other methods can be used, such as using trees. For example, a tree of description elements (strings and description tokens) can be created. A message description for a message can be created as soon as the message is seen. The new message description can be broken into strings and tokens. The tree can be walked (or traversed in any suitable deterministic algorithm), comparing the new message description elements to node values. When a match exists, the message description can be looked up. When no match exists, the message description can be added to the tree, add the message added to the message store, continuing to the next message. Again, using message descriptions, there can be other ways to perform lookups, compare strings, parse, and update the message description set.

User Driven Search Based on Descriptions

Another approach is to use message descriptions to create search expressions based on message description comparisons and commonalities. For example, one or more message descriptions can be selected from a list. These message descriptions can represent the messages to be searched for. An intersection can be found among all searchable terms within the selected message descriptions. For example, the intersection can be determined automatically by software that analyzes the contents of the message description. Using this intersection, all other message descriptions that would match the search term (e.g., using a "MATCHING . . . " parameter) can be found. This can be accomplished by finding intersections, doing a real search against the message descriptions, or some combination thereof. In the situation in which undesirable message descriptions match the search terms, terms from the undesired message descriptions can be defined (e.g., "BUT NOT MATCHING . . . " parameters), causing them to be excluded from the search results. As a result, search results can be significantly narrowed, providing a high probability of returning only the messages represented by the selected message descriptions.

In some implementations, the process can be further modified by using the tokens as entry fields in a user interface. For example, the user can select target message descriptions. The message descriptions can be examined for tokens. The token names can be presented to the user in a manner that allows the use to enter other search terms or expressions, all of which can be added to other search expressions produced in other ways.

In some implementations, the process can be refined further by providing a list of values matching each token. For example, the values can be presented to the user in a list. Upon selection of one or more values, the token plus value(s) information can be added as is, or they can be collected into an optimized expression that is the sum of the selected elements.

Other Methods to Create Message Descriptions

In some implementations, other methods can be used to create message descriptions. In one example, source code can be used, such as by parsing the source code for messages generated by the corresponding application. In another example, executables or shared objects can be read, extracting information for message descriptions from strings considered to be embedded messages. In yet another example, message descriptions can be extracted from documentation (e.g., from user manuals or technical specifications) such as by copy/pasting from the document or by using a document-to-description editor. In another example of creating message descriptions, the message descriptions can be provided by a software vendor, such as in a database, data file or other delivery means. In yet another example, message descriptions can be typed in by hand, word by word, token by token.

Example Message Description Uses

Message descriptions can provide various benefits and enable many different applications. The benefits can result from the basic characteristics of message descriptions. For instance, a message description represents a message, each having any type of ID that allows one to associate the message description with a message. Message descriptions can be created in manual and automated fashions, as described above. The resulting message description can be used to create parsers or parsing rules. Values can be extracted at the point in the message where the token exists. Each token can have a semantic meaning, such as, for example "Source IP Address," "Email Recipient", and so on. Semantic meaning can be anything the user or vendor likes or that fits within an infrastructure or architecture.

The message descriptions can be used to provide flexibility of data storage. For example, data store mechanisms can use the message description and associated tokens to manage where and how raw messages and parsed data can be stored. This can be based several points, including the semantic value applied to the parsed data.

Message Description Attributes

Through the use of IDs, a message description can have attributes associated with any aspect of messages or parsed data use. For example, the parsed data can be transformed before being inserted into a data store. An attribute can be added to the message description and the associated tokens that enables triggering of the transformation before storage. The same attribute can be applied to any message description that contains the same token or semantic meaning.

Message Description Classification

Message descriptions can be classified into groups, such as groups of messages produced by a particular vendor or product. A classification or event description can be an attribute of a message description. Using the classification, a user does not need to refer to the message or the message description when choosing messages for a particular purpose. The user can simply refer to the classification. The use of classification can simplify reporting, searching, parsing, and selection for any other use.

The simple description of the classification scheme can be used to describe the product that generated the message, the type of message, and the event described by the message. The purpose is to express the event and some context that surrounds it in a manner that enable other types of grouping closer to the "bucket" perspective of most classification systems.

Logical Normalization

Logical normalization can be used to map different tokens into a single semantic representation. For example, messages can have different variations of the same general entity, such as "source user," "src user," "suser," "source profile," and other ways of identifying the same type of "source user" semantic. Each of the variations can be mapped to a logically normalized token, allowing all of them to be accessed simultaneously under a single name. This can provide a table or report-like behavior to find messages, message descriptions, and parsed values. Logical normalization can also allow a data store mechanism to choose the best method for storing the information.

Logical normalization can also enable multi-level use of the information. For example, a systems administrator can wish to see data presented in vendor terms, such as wanting see "suser" instead of a generic "source user" name. Similarly. a compliance manager can wish to only use "source user" regardless of what a product vendor can have called it. Using logical normalization to facilitate different presentations can enable product agnostic reporting, data store, search, forensics, correlation, and so on.

Logical normalization can further enable multi-layered access to data independent of terms used by the vendor to define the data. This can eliminate problems associated with vendor-dependent expressions which can affect scalability and manageability across the large set of messages, values, and expressions that are found in logs.

Figure 3:
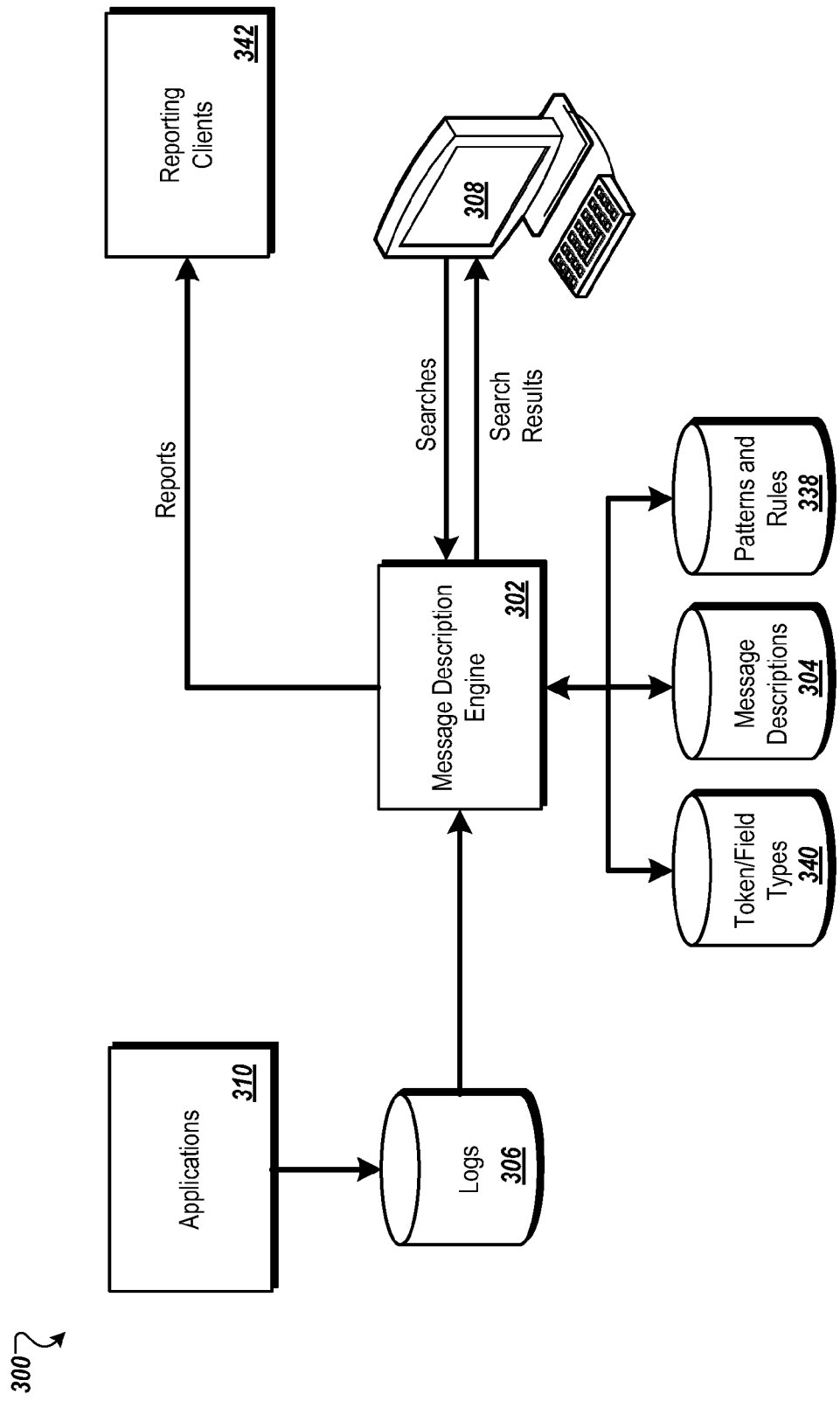
FIG. 3 is a schematic diagram of an exemplary system for creating and using message descriptions.

FIG. 3 is a schematic diagram of an exemplary system 300 for creating and using message descriptions. For instance, the system 300 can represent one exemplary implementation of the message description system 114 described with respect to FIG. 1. The system 300 can also represent (e.g., by way of interrelationships and data flow) the components of the architecture 200 described with respect to FIG. 2.

At the heart of the system 300 resides a message description engine 302. Information corresponding to message descriptions is produced and made available by the message description engine 302. For example, the message description engine 302 can be communicatively coupled to a message descriptions data store 304 that can store all of the message descriptions created by the message description engine 302. The original log messages can also be stored, as well as any other information derived from the logs 306.

Message descriptions can be created, for example, from messages in multiple event logs 306 that are generated by multiple applications 310. For example, the event logs 306 can include log messages created by a server application 310, such as a log of all events (e.g., logins, commands, errors, security anomalies, etc.) corresponding to the server. In one exemplary scenario, the message description engine 302 can process an original log message from the event logs 306 and create a message description of the message for storage in the message descriptions data store 304.

The message description engine 302 can use other types of data to perform its function. For example, a token/field type data store 340 can identify all known field types that can be found in an original message, and the token names of tokens that can be used to represent the fields. For example, the token/field type data store 340 can identify IP addresses, timestamps, user names, computer commands, path names, URLs, error codes, phone numbers, hexadecimal codes, or virtually any type of field that can have a deterministic or other type of pattern. A patterns and rules data store 338 can be used by the message description engine 302 to identify patterns in raw log messages that determine, for example, the token/field types associated with a field.

One or more reporting clients 342 can issue requests for reports, or in some implementations, the reports can be provided automatically, such as on a predetermined schedule. The reports can identify, for example, statistics related to large numbers or groups of messages, such as can be determined by processing the message descriptions data store 304. For example, if the reporting client is a compliance agency, the reports provided by the message description engine 302 can provide statistics based on message descriptions, or the reports can provide specific messages having values of interest to the compliance agencies.

Other information related to message descriptions can be requested from one or more client devices 308. For instance, a user can enter search queries while sitting in front of the client device 308 at an office, government facility, computer room, or anywhere. In one example, the search query issued by the user can be intended to identify all messages that identify a particular IP address. Another example can be a user formulating a search query for all UNIX commands issued by a user named swhitehouse related to a particular directory or path name. Regardless of the query, the message description engine 302 can provide the search results based on message descriptions stored in the message descriptions data store 304. In some implementations, the message description engine 302 can access the token/field type data store 340 and the patterns and rules data store 338 to respond to queries received from the client device 308 or to produce reports for the reporting clients 342.

Figure 4:
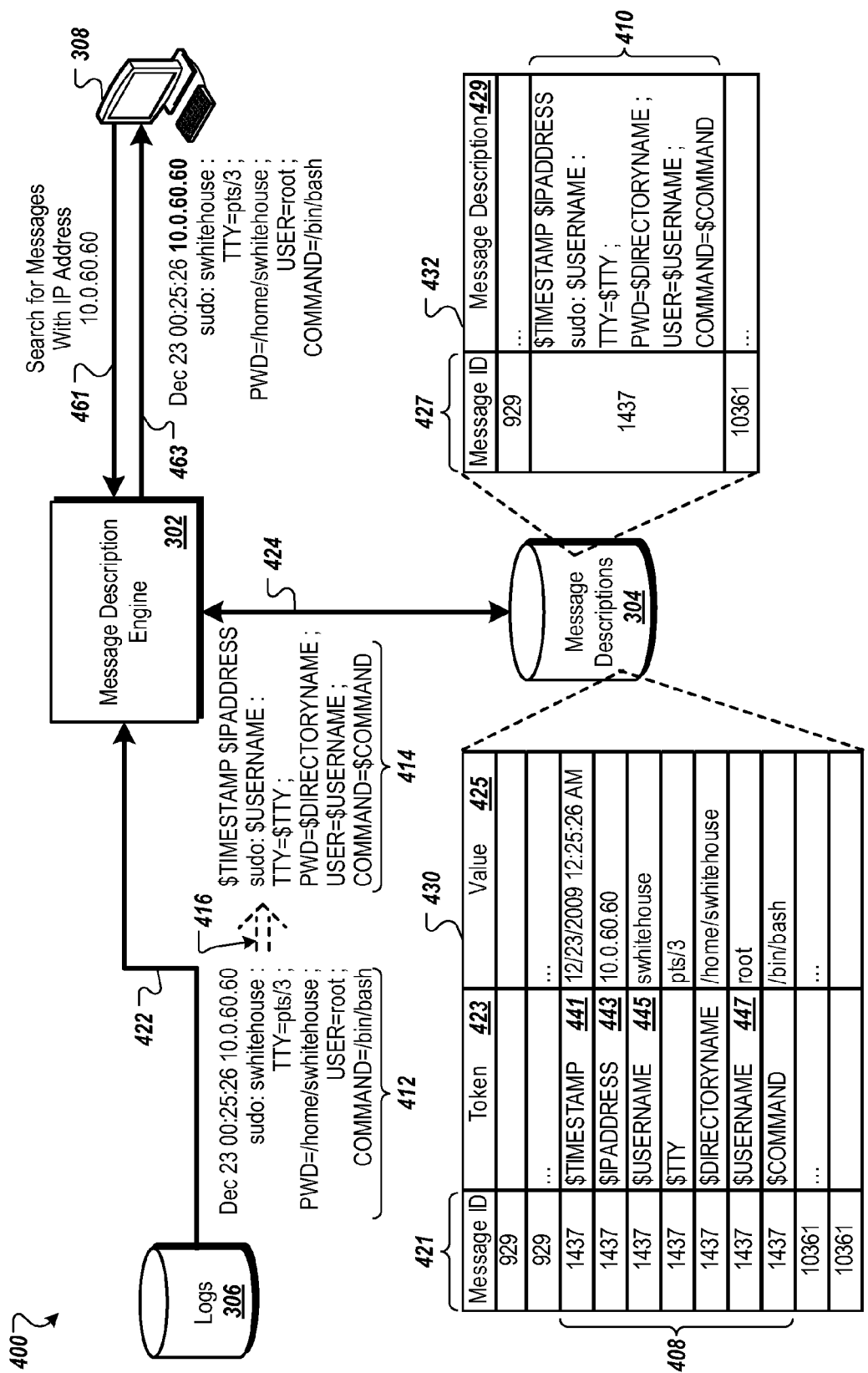
FIG. 4 is a schematic diagram of an exemplary scenario for generating and using message descriptions.

FIG. 4 is a schematic diagram of an exemplary scenario 400 for generating and using message descriptions. Logs 306, received from applications that log event data, are processed by the message description engine 302. In particular, each message received can be processed so that the message descriptions generated are based on tokens and values associated with fields in the original messages. For instance, consider an original message 412 that can be, for example, one of the messages that the message description engine 302 processes 422 from the logs 306. The message 412, as depicted, is a log event associated with a user named "swhitehouse" and further contains several additional fields in addition to the username, including a timestamp, an IP address, a directory name, a computer command, and so on. As such, the message 412 can represent the event of the user swhitehouse issuing a command on a computer (e.g., a server) at a certain time.

One purpose of the message description engine 302 is to make the fields of each message searchable (among other functions) using values associated to particular types of fields, as opposed generic text strings not tied semantically to anything. The message 412 represents an original message before any tokenized processing is performed by the message description engine 302. Using parsing rules and other techniques described above, the message description engine 302 can produce a message description 414, as shown by process arrow 416. The message description engine 302 can then store 424 the message description 414 in a message descriptions data store 304.

Message descriptions can be stored in the message descriptions data store 304 in various ways. In some implementations, the message descriptions can be stored in a token value table 430. As shown, the token value table 430 includes columns for a message ID 421, a token 423 and a value 425. Other implementations can include additional columns, or can use a combination of other tables, data files, etc. For any given message, such as the message 412, multiple rows can exist in the table, and can be associated using a particular message ID 421 (e.g., "1437"). As such, the group of rows 408 correspond to the message 412, having a message ID 421 of "1437". The table 430 contains other rows associated with other messages, such as rows associated with messages having message IDs 421 of "929" and "10361".

Each of the rows in the token value table 430 can identify a specific token-value pair from the original message. For example, a "TIMESTAMP" token 441 has a corresponding value 425 of "12/23/2009 12:25:26 AM" which corresponds to the translation of the first line of message 412 to the message description 414. Another token-value pair is represented by the row having an $IPADDRESS token 443 with a corresponding value of 10.0.60.60. Other token-value pairs include a $USERNAME token 445 with a value of "swhitehouse" and a $USERNAME token 447 with a value of "root."

The message description 414 can be stored, for example, in a message description table 432. Each row in the message description table 432 can store, for example, a message description 429 for a specific message ID 427. For example, the row 410 stored the message description 429 (e.g., "$TIMESTAMP $IPADDRESS sudo: $USERNAME: TTY=$TTY; PWD=$DIRECTORYNAME; USER=$USERNAME; COMMAND=$COMMAND") for the message whose message ID is "1437." The message description represented by the row 410 corresponds to (e.g., is related by message ID "1437" to) the tokens stored in the group of rows 408 in the token value table 430.

In one exemplary use of message descriptions, a user employing a client device 308 can issue a query 461, such as "Search for Messages With IP Address 10.0.60.60." The message description engine 302 can interpret the query 461, and access the tables 430 and 432. Specifically, the message description engine 302 can search on all rows in the token value table 430 for rows having a token 423 of $IPADDRESS, and then more specifically, those rows or entries whose value 425 is "10.0.60.60" as requested by the query 461. As a result, one of the messages identified by executing the query can include the message whose message ID 421 is "1437." The ID of "1437" can be used to look up the corresponding message description 429 in the message description table 432, as shown in entry 410. The tokens in the message can be looked up in the token-value table 430 and substituted, resulting in the message 463 being returned to the user in the result set of the query 461.

In other implementations, other tables or data representations of messages, tokens and values can be used.

Exemplary Process Flow

Figure 5:
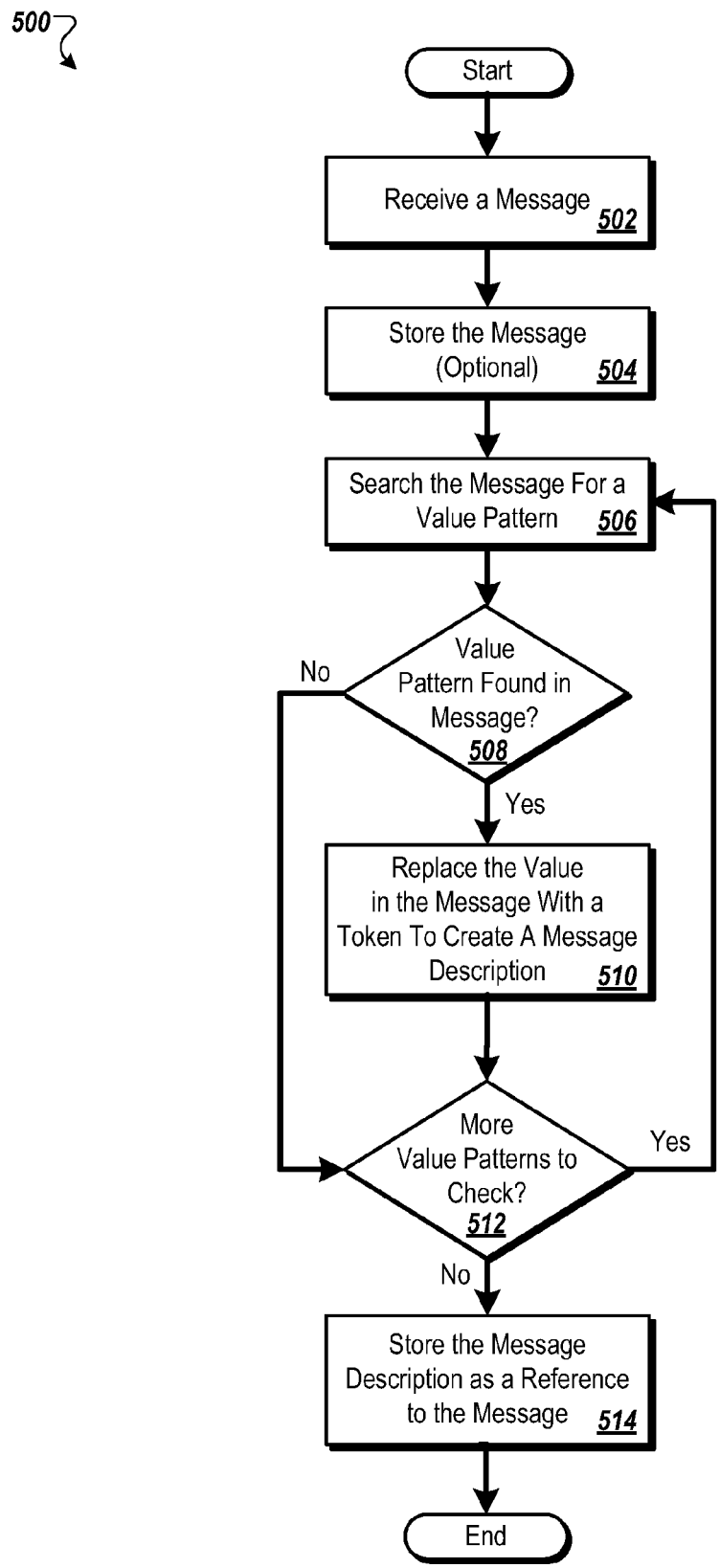
FIG. 5 is a flow diagram of an exemplary process for creating message descriptions.

FIG. 5 is a schematic diagram of an exemplary method 500 for creating message descriptions. In some implementations, the method 500 begins in step 502 when a message is received. For example, the message received can be a message obtained from the logs 306 described with respect to FIG. 3.

In step 504, the message can be stored. This step, however, is optional.

The message is searched for a value pattern in step 506. For example, the searching can include determining if a string pattern is an IP address, user name, phone number, etc.

If a value pattern is found 508, the value is replaced in the message with a token in step 510. For example, if an IP address 100.1.2.3 is found, a token such as $IPADDRESS can be stored in the message, and a link to the actual value 100.1.2.3 can be stored in a separate data store. For instance, referring to FIG. 4, the value 100.1.2.3 can be stored in the token value table 430, while the message containing the token $IPADDRESS can be stored in a separate table (e.g., the tokenized message table 432).

If more value patterns remain 512 to be checked in the message, the process can repeat back to step 506, where another value patterns can be searched.

When all value patterns capable of being replaced with tokens have been replaced, the resulting message description can be stored as a reference to the message.

In some implementations, the combination of a message description, grammar and specific values for different subsets of a message can identify a device. For example, a set of message descriptions might identify a family of devices by the specific content of message descriptions.

In some implementations, a set of message descriptions can identify a log source or family of log sources. This knowledge can allow other meta-data to be associated with the message descriptions. By contrast, conventional log management systems often assume that the user knows the device or log source, but in many practical situations the log source is unknown.

In some implementations, a log source may change in the log management system. For example, the log source can change its IP address or a DNS can point to another physical device with the same domain name. Or the log source might be upgraded to a new version of software that has modifications to its log formats. For example, a set of message descriptions can identify when a software upgrade that modifies log formats has occurred. A message description system based analysis system can manage the change, for example, by combining information from the new and old log formats.

In some implementations, message descriptions can be combined with a taxonomy/classification system to aid in log message analysis.

Host Device Architecture

Figure 6:
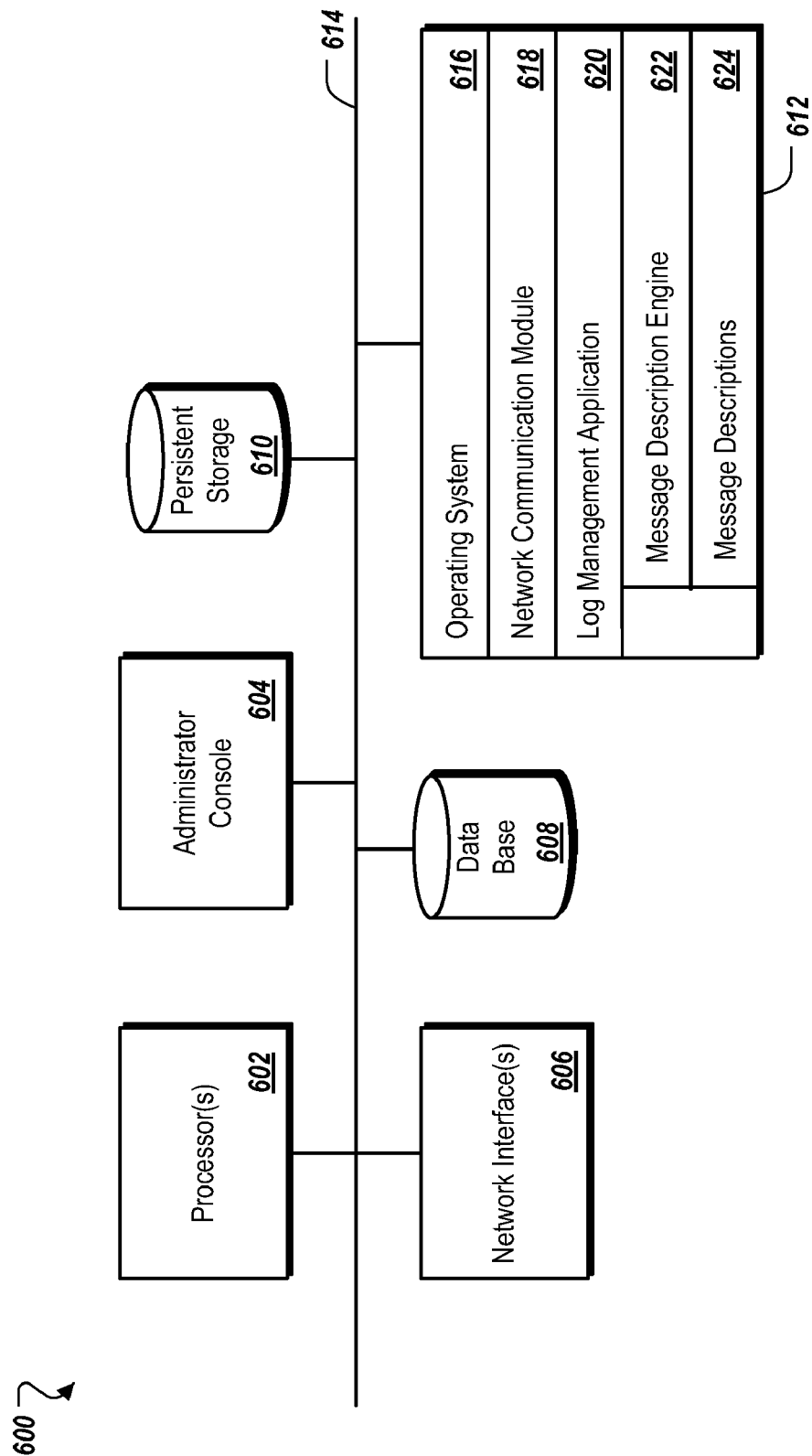
FIG. 6 is a block diagram of an exemplary architecture for hosting a message description system.

FIG. 6 is a block of an exemplary architecture 600 for hosting a message description system 114. In some implementations, the architecture 600 includes one or more processors 602 (e.g., dual-core Intel® Xeon® Processors), an optional administrator console 604, one or more network interfaces 606, a database 608, persistent storage 610 and memory 612 (e.g., RAM, ROM, SDRAM, flash memory). These components can exchange communications and data over one or more communication channels 614 (e.g., Ethernet, Enterprise Service Bus, PCI, PCI-Express, etc.), which can include various known network devices (e.g., routers, hubs, gateways, buses) and utilize software (e.g., middleware) for facilitating the transfer of data and control signals between devices.

The database 608, persistent storage 610 and memory 612 can be a computer-readable medium. The term "computer-readable medium" refers to any medium that participates in providing instructions to a processor 602 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

In some implementations, the memory 612 further includes an operating system 616 (e.g., Mac OS® server, Windows® NT server), a network communication module 618 and a log management application 620. The operating system 616 can be multi-user, multiprocessing, multitasking, multithreading, real time, etc. The operating system 616 performs basic tasks, including but not limited to: recognizing input from and providing output to the administrator computer 604; keeping track and managing files and directories on computer-readable mediums (e.g., memory or a storage device); controlling peripheral devices (e.g., database 608, persistent storage 610); and managing traffic on the one or more communication channels 614. The network communications module 618 includes various components for establishing and maintaining network connections (e.g., software for implementing communication protocols, such as TCP/IP, HTTP, etc.) with various devices over a network, such as the collectors 102a through 102n. The log management application 620 includes a message description engine 622 and message descriptions 624. Each of these components is described in reference to FIGS. 1-5.

The architecture 600 is one example of a suitable architecture for hosting a log management application 620. Other architectures are possible, which include more or fewer components. For example, the database 608 and persistent storage 610 can be the same storage device or separate storage devices. The components of architecture 600 can be located in the same facility or distributed among several facilities. The architecture 600 can be implemented in a parallel processing or peer-to-peer infrastructure or on a single device with one or more processors. The log management application 620 can include multiple software components or it can be a single body of code. Some or all of the functionality of the log management application 620 can be provided as a service to end users over a network.

Example Applications of Message Descriptions

There are many applications that can use message descriptions. Some example applications include but are not limited to: automated parser construction, automated parser rule construction, refined manual and automatic classification of a message based on a complete message description, message description driven database schema or other data store method construction automation, message description driven report construction automation, refined index or other type of original message search construction automation, distributed processing, customer driven log, message, and value management and manipulation, rapid and accurate product support development, improving the depth of product support through the ability to address more messages than allowed using current processes, customer self support, closed loop support (e.g., customers send descriptions to log management service provider for review and correction, leading to rapid turn around for product updates).

In some implementations, message descriptions can support attribute inheritance. For example, once a first message description has been defined and attributes are assigned to the first message description, the same attributes can be assigned to a second message description when the second message description is essentially the same as the first message description but in a different format.

In some implementations, message descriptions support simple multi-language and internationalization support. For example, if a first message description is a direct translation of a second message description, and there is a message description for the second message description, then the first and second message descriptions can be made equivalent to the message description system by associating IDs.

In some implementations, message descriptions support complete message awareness. For example, currently it is difficult to know when a new message-type has appeared in a log. By creating a message description for the new message, and comparing it to existing message descriptions, a new message determination can be made. The user can then be notified in some form that new message has arrived.

Although a few implementations have been described in detail above, other modifications are possible. In addition, the logic flows depicted in the figures do not require the particular order shown, or sequential order, to achieve desirable results. In addition, other steps can be provided, or steps can be eliminated, from the described flows, and other components can be added to, or removed from, the described systems. Nevertheless, it will be understood that various modifications can be made without departing from the spirit and scope of the following claims. Accordingly, other implementations are within the scope of the following claims.

What is claimed is:

1. A computer-implemented method, comprising:
receiving a first message, the first message comprising a structure that includes a value and a context of the value;
searching the first message using a value pattern, the value pattern including a string pattern of the value and being different from the structure;
generating a first message description for the first message, wherein generating the first message description comprises:
identify the value from the first message that matches the value pattern;
generating a token, the token including a named string for the value; and
generating the first message description using the structure in the first message in which the token replaces the value, the first message description comprising the structure of the first message, wherein in the first message description, the token is placed in the context of the value according to the structure in the first message; and
storing the first message description as a reference to the first message.

2. The method of claim 1, where the searching is grammar independent such that the first message description is operable to describe messages from different vendors or products.

3. The method of claim 1, where the first message description is operable to describe all messages in a message set.

4. The method of claim 1, where the first message is formatted as one or more lines of text, structured data or binary data.

5. The method of claim 1, where the first message description includes a relationship of the first message to its values.

6. The method of claim 1, where the first message description includes a relationship between the first message and a second message.

7. The method of claim 1, further comprising:
constructing a parsing or mapping rule that supports the first message description for the first message; and
applying the parsing rule to a second message.

8. The method of claim 1, further comprising:
correcting the first message description; and
creating a second message description using the corrected first message description.

9. The method of claim 1, further comprising:
generating a report using the first message description.

10. The method of claim 1, further comprising:
searching a log message database using the first message description.

11. A message management system, comprising:
at least one computing device, wherein the computer device has a processor and a memory;
an interface coupled to a message collector for receiving a first message, the first message comprising a structure that includes a value and a context of the value; and
a message description system coupled to the interface, the message description system configured for:
searching the first message using a value pattern, the value pattern including a string pattern of the value and being different from the structure;
generating a first message description for the first message, wherein generating the first message description comprises:
identify the value from the first message that matches the value pattern; generating a token, the token including a named string for the value; and generating the first message description using the structure in the first message in which the token replaces the value, the first message description comprising the structure of the first message, wherein in the first message description, the token is placed in the context of the value according to the structure in the first message; and
storing the first message description as a reference to the first message.

12. The system of claim 11, where the searching is grammar independent such that the first message description is operable to describe messages from different vendors or products.

13. The system of claim 11, where the first message description is operable to describe all messages in a message set.

14. The system of claim 11, where the first message is formatted as one or more lines of text, structured data or binary data.

15. The system of claim 11, where the first message description includes a relationship of the first message to its values.

16. The system of claim 11, where the first message description includes a relationship between the first message and a second message.

17. The system of claim 11, where the message description system is configured for:
constructing a parsing or mapping rule that support the first message description; and
applying the parsing or mapping rule to a second message.

18. The system of claim 11, where the message description system is configured for:
correcting the first message description; and
creating a second message description using the corrected first message description.

19. The system of claim 11, further comprising:
a reporting engine configured for generating reports using the first message description.

20. The system of claim 11, further comprising:
a search engine configured for searching a log message database using the first message description.

21. A non-transitory computer storage device storing instructions operable to cause one or more computer processors to perform operations comprising:
receiving a first message, the first message comprising a structure that includes a value and a context of the value;
searching the first message using a value pattern, the value pattern including a string pattern of the value and being different from the structure;
generating a first message description for the first message, wherein generating the first message description comprises:
identify the value from the first message that matches the value pattern; generating a token, the token including a named string for the value; and generating the first message description using the structure in the first message in which the token replaces the value, the first message description comprising the structure of the first message, wherein in the first message description, the token is placed in the context of the value according to the structure in the first message; and
storing the first message description as a reference to the first message.

* * * * *